United States Patent [19]

Kamiya

[11] Patent Number: 5,287,533
[45] Date of Patent: Feb. 15, 1994

[54] APPARATUS FOR CHANGING INDIVIDUAL WEIGHT VALUE OF CORRESPONDING SYNAPTIC CONNECTION FOR SUCCEEDING LEARNING PROCESS WHEN PAST WEIGHT VALUES SATISFYING PREDETERMINED CONDITION

[75] Inventor: Shin Kamiya, Nara, Japan

[73] Assignee: Sharp Kabushiki Kaisha, Osaka, Japan

[21] Appl. No.: 723,495

[22] Filed: Jun. 28, 1991

[30] Foreign Application Priority Data

Jun. 28, 1990 [JP] Japan .................................. 2-172051

[51] Int. Cl.$^5$ ............................................ G06F 15/18
[52] U.S. Cl. ........................... 395/800; 395/23; 364/916.2; 364/972.4; 364/261.2; 364/274.9; 364/DIG. 1
[58] Field of Search ................... 395/800.20, 21, 23, 395/24

[56] References Cited

U.S. PATENT DOCUMENTS

| | | | |
|---|---|---|---|
| 3,584,145 | 6/1971 | Cutler et al. | 175/7.1 |
| 3,794,981 | 2/1974 | O'Connor | 340/172.5 |
| 4,161,782 | 7/1979 | McCracken | 364/571 |
| 4,715,002 | 12/1987 | Vernon et al. | 364/422 |
| 4,799,185 | 1/1989 | Taylor | 364/900 |
| 4,827,259 | 5/1989 | Murphy et al. | 341/123 |
| 4,858,147 | 8/1989 | Conwell | 364/513 |
| 4,912,655 | 3/1990 | Wood | 364/513 |
| 4,972,363 | 11/1990 | Nguyen et al. | 364/807 |
| 5,014,219 | 5/1991 | White | 364/513 |
| 5,046,020 | 9/1991 | Filkin | 364/513 |
| 5,056,037 | 10/1991 | Eberhardt | 364/513 |
| 5,093,899 | 3/1992 | Hiraiwa | 395/23 |
| 5,119,469 | 6/1992 | Alkon et al. | 395/23 |
| 5,168,550 | 12/1992 | Sakaue et al. | 395/23 |
| 5,195,169 | 3/1993 | Kamiya et al. | 395/23 |
| 5,216,746 | 1/1993 | Yoshizawa et al. | 395/24 |
| 5,222,195 | 6/1993 | Alkon et al. | 395/24 |

FOREIGN PATENT DOCUMENTS 2-43665 2/1990 Japan .
2-231670 9/1990 Japan .

*Primary Examiner*—Thomas C. Lee
*Attorney, Agent, or Firm*—Morrison & Foerster

[57] ABSTRACT

The past record of the synaptic weight values set in the learning of a neural network is stored in a weight record memory. The past stored in the weight record memory is supplied to a control unit. If there exists a synaptic connection representing a record of weight values which have been used in a predetermined number of learning processes just prior to the present learning process and which satisfy a predetermined condition, the synaptic weight value used in the succeeding learning processes for the synaptic connection is re-set to a predetermined value by a weight setting unit. That is, the past record of the synaptic weight values is monitored, and the synaptic weight value which has been set in a learning process can be re-set as required.

18 Claims, 3 Drawing Sheets

APPARATUS FOR CHANGING INDIVIDUAL WEIGHT VALUE OF CORRESPONDING SYNAPTIC CONNECTION FOR SUCCEEDING LEARNING PROCESS WHEN PAST WEIGHT VALUES SATISFYING PREDETERMINED CONDITION

BACKGROUND OF THE INVENTION

1. Field of the Invention

The present invention relates to a neural network in which, when learning is performed, the value of a synaptic weight can be externally and forcedly re-set.

2. Description of the Prior Art

In recent years, a multi-layer neural network in which the learning is performed by the error back-propagation learning method has been utilized in a field of speech or character recognition. A neural network usually used in such a field is of a multilayer perceptron type, typically, the three-layer perceptron type. As shown in FIG. 2, a three-layer perceptron type neural network comprises an input layer 21, an intermediate layer 22, and an output layer 23.

Units 25 in the input layer 21, units 26 in the intermediate layer 22, and units 27 in the output layer 23 are synaptically connected so as to constitute a network. When data are input into the units 25 of the input layer 21, data in accordance with the configuration of the network are output from the units 27 of the output layer 23. Each of these units comprises a portion for receiving data input from another unit, a portion for converting the input data based on a predetermined rule, and a portion for outputting the converted result to a unit which constitutes the upper layer. To a synaptic connection between the units, a weight indicative of the connecting strength is applied. Hereinafter, such a connection weight is referred to as "a synaptic weight". If the value of the synaptic weight is changed, the configuration of the network changes so that the network outputs a different output value for the same input data.

The learning of the neural network is carried out as follows. Learning data which belong to a known category are input into the units 25 of the input layer 21, and teaching data or target indicative of the category to which the input data belong are supplied to the units 27 of the output layer 23. The synaptic weights are set so that the units 27 of the output layer 23 output the same data as the teaching data. Generally, such learning is performed by the error back-propagation learning method.

When data representative of the feature pattern of an object to be recognized are input into the units 25 of the input layer 21, the thus learned neural network outputs data representative of a category to which the input data belong, from the units 27 of the output layer 23. Accordingly, based on the category represented by the output data, the category to which the input data (i.e., the feature pattern) belong can be accurately identified.

Since the number of the units 26 of the intermediate layer 22 in the above-mentioned three-layer perceptron type neural network is determined by trial and error, the number of units of the intermediate layer 22 is generally set to be substantially larger than a number which may be necessary for achieving a required recognition accuracy. As a result, the calculation time period for the entire neural network is longer, or some of the units do not affect the learning or recognition. This causes a problem in that the efficiency in the learning or recognition is decreased.

The inventor and Mr. Togawa have proposed an apparatus for controlling the learning of a neural network (Japanese Patent Application No. 1-52684 which is now published as Japanese Patent Publication (Kokai) No. 2-231670 and U.S. patent application Ser. No. 07/486,165 filed on Feb. 28, 1990) now U.S. Pat. No. 5,195,169, which is shown in FIG. 4. This proposed apparatus comprises a monitor 4 which monitors the progress of the learning in the neural network, as shown in FIG. 4. In FIG. 4, units in the respective layers, connections between respective units, synaptic weights Wd and Wu, input data, and output data of the three-layer perceptron type neural network of FIG. 2 are shown in a simplified manner.

In this system, a synaptic weight Wd is applied to the synaptic connection of each of the units in the intermediate layer 22 which are connected with all of the units in the input layer 21, and a synaptic weight Wu is applied to the synaptic connection of each of the units in the output layer 23 which are connected with all of the units in the intermediate layer 22. The monitor 4 receives: the values of the synaptic weights Wd and Wu; output data from each of the units in the output layer 23; and teaching data, and monitors the values of the synaptic weights Wd and Wu in the learning process of the neural network. For example, in the cases where units not affecting the learning exist when the learning is nearly converged, where units exhibiting a similar synaptic weight exist when the learning is nearly converged, or where units exhibiting a similar synaptic weight when the learning is not converged, the values of the synaptic weights Wd and Wu corresponding to these units are set to zero. Thus, the learning efficiency can be increased, and the number of units in the intermediate layer 22 can be modified to the optimum number, so that the optimum configuration of the neural network is established.

In short, in the above-mentioned apparatus, the values of the synaptic weights Wu and Wd are monitored, and the values of the synaptic weights Wu and Wd are set to zero. In such an apparatus, however, the values of the synaptic weights Wu and wd which can be monitored by the monitor 4 are limited to those of the synaptic weights Wu and Wd at a certain learning point. Accordingly, the existence of units which do not affect the learning or which exhibit a similar synaptic weight value is judged based on the values of the synaptic weights Wu and Wd at the present learning point.

Practically, the progress of the learning is indicated by the combination of the values of the synaptic weights Wu and Wd at an interested learning point and the past record of the values of the synaptic weights Wu and Wd. Accordingly, there arises a problem that the progress of the learning cannot be appropriately judged by the values of the synaptic weights Wu and Wd at a certain learning point.

SUMMARY OF THE INVENTION

The apparatus of this invention, which overcomes the above-discussed and numerous other disadvantages and deficiencies of the prior art, monitors weight values of synaptic connections between units of a neural network, said weight values being able to be set in a learning process, and comprises: weight record store means for storing the past records of weight values which have been set in a predetermined number of preceding learning processes; control means for receiving said past records from said weight record store means, and for judging whether or not said received past records satisfy a predetermined condition; and weight setting means for, when one of said received past records is judged that said one past record satisfies said predetermined condition, re-setting the weight value of the synaptic connection which corresponds to said one past record, to a predetermined value in one or more succeeding learning processes.

In the above apparatus, the past record of the synaptic weight values which have been set in learning processes of a neural network is stored in the weight record store means, and then supplied to the control means. If there exists a synaptic connection representing a record of weight values which have been used in a predetermined number of learning processes just prior to the present learning process and which satisfy a predetermined condition, the synaptic weight value used in the succeeding learning processes for the synaptic connection is re-set to a predetermined value by the weight setting unit. Namely, the progress of learning is monitored based on the past record of the synaptic weight values, and the synaptic weight value which has been set in a learning process can be re-set as required.

The neural network according to the invention, in which weight values of synaptic connections between units of said neural network are monitored, said weight values being able to be set in a learning process. The neural network comprises: weight record store means for storing the past records of weight values which have been set in a predetermined number of preceding learning processes; control means for receiving said past records from said weight record store means, and for judging whether or not said received past records satisfy a predetermined condition; and weight setting means for, when one of said received past records is judged that said one past record satisfies said predetermined condition, re-setting the weight value of the synaptic connection which corresponds to said one past record, to a predetermined value in one or more succeeding learning processes.

Preferably, the number of said succeeding learning processes is predetermined.

In a preferred embodiment, said apparatus further comprises count means for counting the number of learning processes in which said re-set is performed by said weight setting means, said count means being reset when said control means judges that said one past record satisfies said predetermined condition, said weight setting means performing said re-set until the contents of said count means reach said predetermined number.

In the above configuration, the count means counts the period during which the synaptic weight value of the neural network is locked to a predetermined value. The weight setting unit re-sets the synaptic weight value to the predetermined value, during the period counted by the count means. Therefore, the past record of the synaptic weight values is monitored, and the synaptic weight value, which has been set in each of the learning processes, can be reset during the period counted by the count means as required.

Preferably, said predetermined condition is the condition in which the weight value of a synaptic connection has not been updated during a further predetermined number of preceding learning processes, and/or the condition in which the weight value of a synaptic connection oscillates with respect to a certain value.

In the above configurations, the past record of the synaptic weight value is monitored, and, when learning for a synaptic connection falls into a local optimal solution, the learning for the synaptic connection can be stopped to escape from the local optimal solution.

Preferably, said certain value is the average of weight values included in said one past record.

Preferably, said count means is provided for each of said synaptic connections.

Preferably, said control means comprises average means for calculating the average of weight values included in each of said past records.

Preferably, said predetermined condition is the condition in which the absolute value of the difference between the average of weight values included in the past record of one synaptic connection and the current weight value of said one synaptic connection is smaller than a prefixed value.

Thus, the invention described herein makes possible the objectives of:

(1) providing an apparatus for controlling the learning of a neural network in which the progress of the learning can be monitored based on the values of synaptic weights used in the learning of the neural network;

(2) providing an apparatus for controlling the learning of a neural network in which the values of synaptic weights set in the learning can be re-set as required; and (3) providing a neural network in which the progress of the learning can be appropriately judged.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
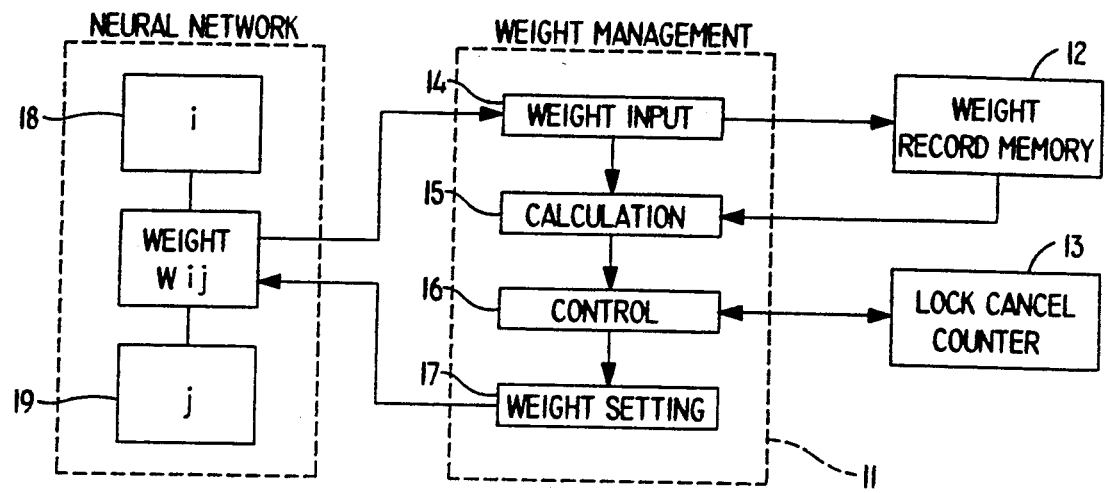
FIG. 1 is a block diagram of illustrating an apparatus according to the invention.
Figure 2:
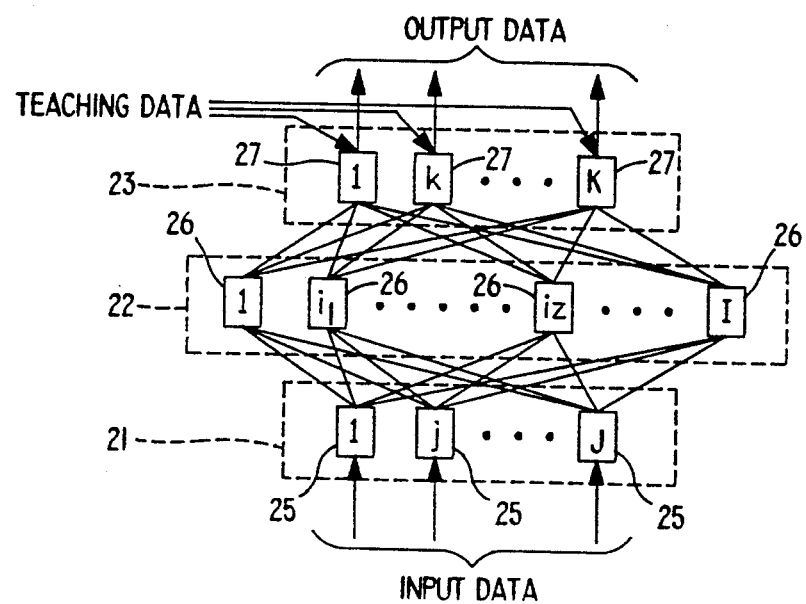
FIG. 2 diagrammatically shows a three-layer perceptron type neural network.

FIG. 1 illustrates an apparatus for controlling the learning of a neural network according to the invention. In this embodiment, when the value of a synaptic weight (hereinafter, referred to as "a synaptic weight value") set by the usual error back propagation has not been updated during a predetermined number of learning processes, or when a synaptic weight value oscillates with respect to a certain value, the learning progresses while locking or fixing a synaptic weight value which will be set in a predetermined number of succeeding learning processes.

The learning in a neural network is performed as follows. Learning data which belong to a known category are input into units of an input layer of the neural network, and teaching data representing the category to which the learning data belong are supplied to units of an output layer. Then, synaptic weights are set so that the units of the output layer output the same data as the teaching data. Accordingly, a neural network has functions of calculating an error between the value of the teaching data and the value of the output data from the units of the output layer, and of setting each of synaptic weight values based on the calculated error value.

Hereinafter, the setting of a synaptic weight value conducted by the function which is provided in a conventional neural network is referred to as "usual learning". In contrast, the re-setting (locking) of a synaptic weight value which has been set in the usual learning is referred to as "relearning". The term "learning" used in the description of the invention designates both the usual learning and the relearning.

In FIG. 1, the portions relating to a function which can be performed by a conventional neural network (i.e., the usual learning function) are omitted, and only the portions relating to the relearning function are shown. This embodiment is applied to a multi-layer perceptron type neural network which is representatively shown by an arbitrary layer 18 (upper layer) and a lower layer 19 corresponding to the upper layer 18. In FIG. 1, units constituting the upper and lower layers 18 and 19, and connections between the units are not shown, and the synaptic weights between the units in the upper layer 18 and those in the lower layer 19 are representatively designated by a synaptic weight Wij between the ith unit of the upper layer 18 and the jth unit of the lower layer 19.

The present apparatus comprises a weight management section 11, a weight record memory 12, and a lock cancel counter 13. The value of a synaptic weight Wij is set so that, every time learning data and teaching data for one learning process are input (i.e., every learning process), the value of the output data corresponding to the input learning data is made closer to the value of the teaching data by the usual learning in the error back-propagation learning. The thus set value of the synaptic weight Wij for each learning is sequentially stored into the weight record memory 12. Namely, the weight record memory 12 stores the past record of the synaptic weight Wij in a storage area allocated to the corresponding synaptic connection.

The weight management section 11 is actuated every time learning data are input into the neural network, and checks the synaptic weight in the following manner. The average of the values of the synaptic weight Wij produced in the latest learning processes (the number of which is predetermined) is calculated, based on the past record of the values of the synaptic weight Wij stored in the weight record memory 12. When the relationship between the contents of the lock cancel counter 13 and the calculated average of the synaptic weight Wij satisfies a predetermined condition, each of the values of the synaptic weight Wij is locked or fixed to a predetermined value in a predetermined number of succeeding learning processes.

The operation of the weight management section 11 will be described in more detail. As shown in FIG. 1, the weight management section 11 comprises a weight input unit 14, a calculation unit 15, a control unit 16, and a weight setting unit 17. The value of the synaptic weight Wij which is set in the present usual learning process (tth learning process) is input to the weight input unit 14. Hereinafter, the abovementioned value of the synaptic weight Wij which is set in the tth learning process is represented by W(t). The weight input unit 14 supplies the value W(t) to the calculation unit 15, and also to the weight record memory 12 which in turn stores the value W(t). The calculation unit 15 calculates the average aveW of the values of the synaptic weight Wij in T preceding learning processes (i.e., from the (t−T)th learning process the (t−1)th learning process), based on the record of the values of the synaptic weight Wij which is supplied from the weight record memory 12 (where T is a predetermined number). The obtained result is sent to the control unit 16 together with the value W(t) supplied from the weight input unit 14.

The control unit 16 checks the value W(t) and the average aveW supplied from the calculation unit 15 to detect states where the value of the synaptic weight Wij has not been updated for a predetermined period (i.e., in T preceding learning processes), and where the value of the synaptic weight Wij oscillates with respect to a fixed value. When the contents of the lock cancel counter 13 are equal to "0", and when one or both of the above-mentioned two states is detected, the control unit 16 sets the contents of the lock cancel counter 13 to a predetermined value so as to lock the value of the synaptic weight Wij to the value W(t) in a predetermined number of learning processes. As a result of this setting, the weight setting unit 17 re-sets the value of the synaptic weight Wij in every usual learning process to the value W(t), until the contents of the lock cancel counter 13 become "0". Through this procedure, the value of the synaptic weight Wij is locked to the value W(t) in the predetermined number of learning processes. Namely, the lock cancel counter 13 serves as the count means.

When the contents of the lock cancel counter 13 are equal to "0", and when any of the above-mentioned two states is not detected by the control unit 16, the control unit 16 does not operate. That is, the contents of the lock cancel counter 13 remain "0", and the weight setting unit 17 does not re-set the value of the synaptic weight Wij. Accordingly, the value of the synaptic weight Wij is held at the value which has been set in the usual error back-propagation learning.

As described above, when the value of the synaptic weight Wij has not been updated for a predetermined period, or when the value of the synaptic weight Wij oscillates with respect to a fixed value, the learning based on the synaptic weight Wij is judged to be in a local optimal solution. In this case, the value of the synaptic weight Wij is locked, and the learning is temporarily suspended, thereby allowing the process to escape from such a state.

Figure 3:
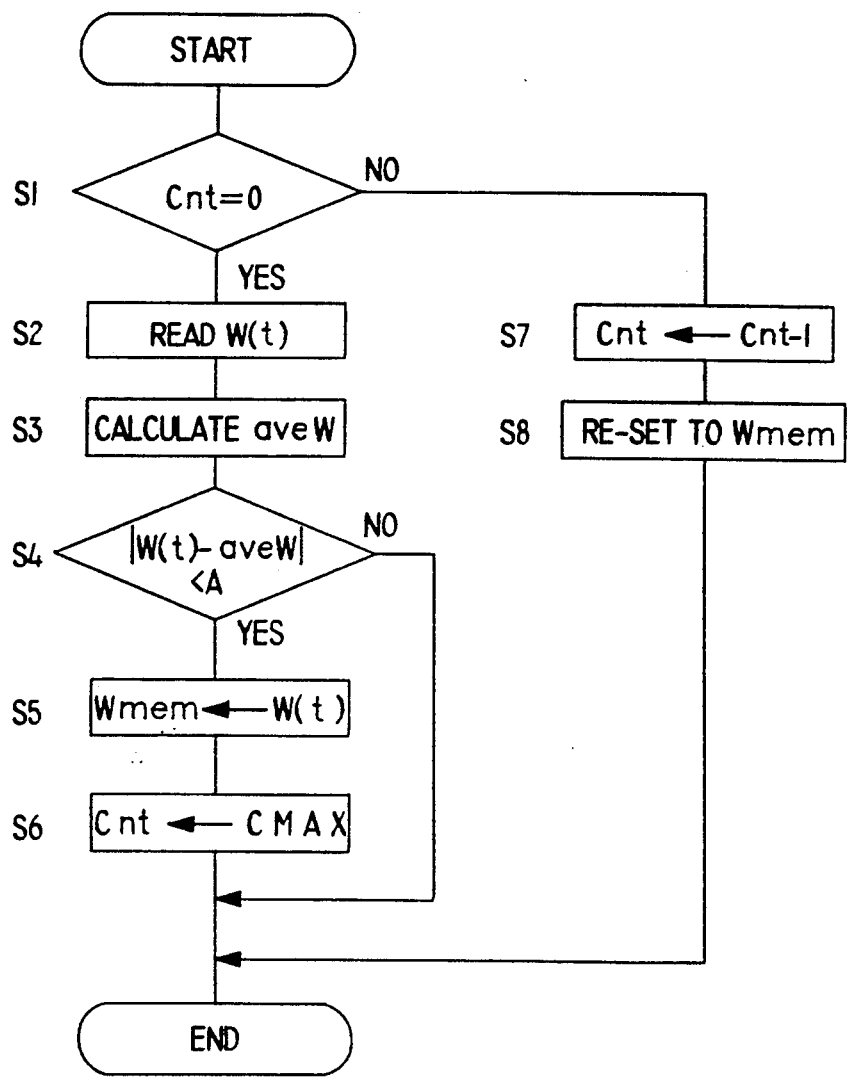
FIG. 3 is a flowchart of the weight control operation in one relearning process.
Figure 4:
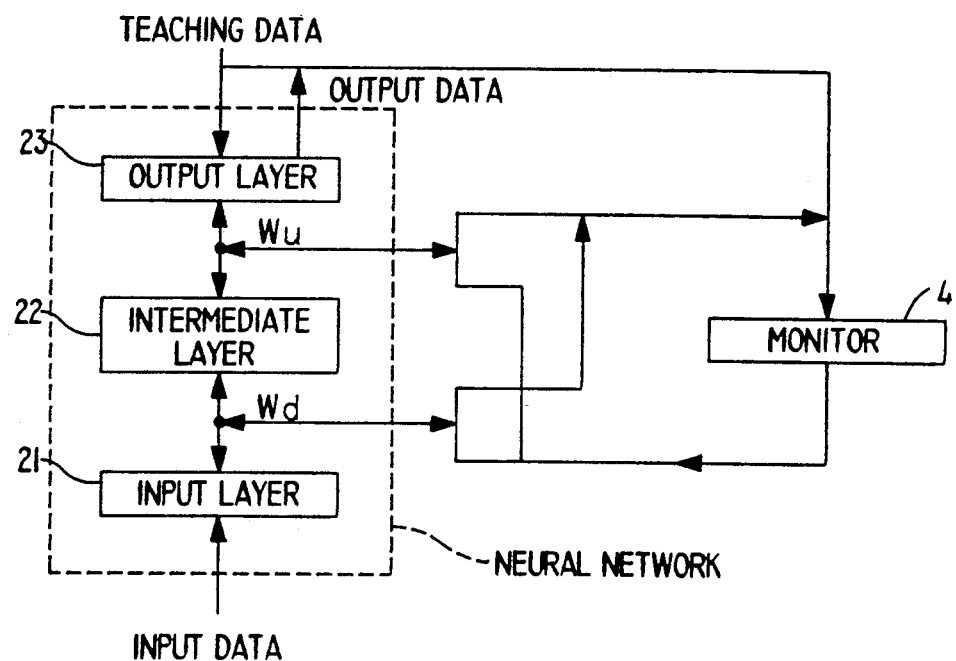
FIG. 4 is a block diagram illustrating a prior art apparatus for controlling the learning of a neural network.

FIG. 3 is a flowchart of the weight control and processing operations in one relearning process under the control of the control unit 16. The weight control and processing operations will be further described with reference to FIG. 3.

The reference symbols designate as follows:

W(t): the value of a synaptic weight Wij which is set in the tth usual learning process;

Cnt: the contents of a storage area for a synaptic connection of the lock cancel counter 13 (the initial value is "0");

CMAX: the period (i.e., the number of learning processes) for which the value of the synaptic weight Wij is locked;

aveW: the average of the values of synaptic weight Wij used in T number of preceding learning processes (i.e., from the (t−T)th learning process to the (t−1)th learning process);

A: a constant; and

Wmem: a variable.

In step S1, it is judged whether or not the contents Cnt for an interested synaptic connection are "0". If the contents Cnt are "0", the value of the synaptic weight Wij need not be locked, and the process proceeds to step S2. If the contents Cnt are not "0", the process proceeds to step S7.

In step S2, the value W(t) of the synaptic weight Wij which is set in the present (i.e., the tth) usual learning process is read out from the neural network.

In step S3, the past record of the synaptic weight Wij, i.e., the values of the synaptic weight Wij used in the (t−T)th to (t−1)th learning processes are read out from the weight record memory 12, and the average aveW of the read-out values is calculated.

In step S4, it is judged whether or not the absolute value of the difference between the value W(t) and the average aveW is smaller than the constant A. If the absolute value is smaller than the constant A, it is determined that the value of the synaptic weight Wij has not been updated for a predetermined period (for the period of T learning processes), or that the value of the synaptic weight Wij oscillates with respect to the value aveW. Then, the process proceeds to step S5, to initiate the operation locking the value of the synaptic weight Wij.

If the absolute value is not smaller than the constant A in step S4, the weight control and processing operations in one relearning process are ended. That is, it is judged that the usual learning has been normally progressed until the tth learning process (more correctly, in the (t−T)th to (t−1)th learning processes), and since the value W(t) which is set in the tth usual learning process is valid, the value of the synaptic weight Wij is held at the value W(t).

In step S5, the value of the variable Wmem is updated to the value W(t) of the synaptic weight Wij used in the tth usual learning process.

In step S6, the contents Cnt are updated to CMAX, and the weight control operation in one relearning process is ended.

If the contents Cnt are not "0" in step S1, the processes of steps S7 and S8 are performed. In step S7, the operation of the relearning is started, and the value of the synaptic weight Wij which has been set in the usual learning is locked. The contents Cnt are decremented by one.

In step S8, the value of the variable Wmem is output from the weight setting unit 17. The value of the synaptic weight Wij which has been set in the usual learning is re-set to the value of the variable Wmem, and the weight control operation for one relearning process is ended.

The resetting operation of the value of the synaptic weight Wij is repeated until the contents Cnt become "0". This means that the value of the synaptic weight Wij is locked to the value W(t) during the period of performing the CMAX number of learning processes. After performing the CMAX number of learning processes, the contents Cnt become "0", and the value of the synaptic weight Wij is held at the value which is set in the usual error back-propagation learning.

As described above, in this embodiment, the calculation unit 15 calculates the average aveW, based on the values of the synaptic weight Wij used in the (t−T)th to (t−1)th learning processes which values are stored in the weight record memory 12. Then, the control unit 16 sets the contents Cnt to the predetermined value CMAX, when the contents Cnt are "0" and when the absolute value of the difference between the average aveW obtained in the calculation unit 15 and the value W(t) input from the weight input unit 14 is smaller than the constant A.

Therefore, when the absolute value of the difference between the value W(t) and the average aveW is smaller than the constant A (this means for example that the learning according to the synaptic weight Wij falls into a local optimal solution), the learning according to the synaptic weight Wij in the succeeding CMAX number of learning processes is not conducted, so that the learning can escape from the local optimal solution.

In short, the progress of learning is accurately judged based on the past record of the values of the synaptic weight Wij used in the preceding learning processes (the (t−T)th to (t−1)th learning processes), and the value of the synaptic weight wij can be re-set as required.

An algorithm for detecting the state where the value of the synaptic weight Wij has not been updated for a predetermined period or the state where the value of the synaptic weight Wij oscillates with respect to a fixed value is not limited to that used in the above embodiment.

In the above, the embodiment for a three-layer perceptron type neural network has been described. The type of a neural network useful in the invention is not restricted to the three-layer perceptron type neural network, and the invention may be applied to a perceptron type neural network having four or more layers or to a neural network of another type.

According to the invention, the past record of the synaptic weight values stored in the weight record memory is supplied to the control unit. If there exists a synaptic connection representing a record of weight values which have been used in a predetermined number of learning processes just prior to the present learning process and which satisfy a predetermined condition, the synaptic weight value used in the succeeding learning processes for the synaptic connection is re-set to a predetermined value by the weight setting unit. In short, the past record of the synaptic weight values is monitored, and the synaptic weight value which has been set in a learning process can be re-set as required.

The above predetermined conditions can be used as criteria for judging the progress of learning, so that the progress of learning can be controlled based on the past record of the synaptic weight values.

According to the invention, the apparatus may be provided with count means for counting the period during which the synaptic weight value of the neural network is locked to a predetermined value. In this configuration, the weight setting unit re-sets the synaptic weight value to the predetermined value, during the period counted by the count means. Therefore, the past record of the synaptic weight values is monitored, and the synaptic weight value, which has been set in each of the learning processes, can be reset during the period counted by the count means as required.

The apparatus according to the invention may be provided with a control unit which detects a state where a synaptic weight value has not been updated for a predetermined period or a state where a synaptic weight value oscillates with respect to a certain value. In the apparatus, the past record of the synaptic weight value is monitored, and, when learning for a synaptic connection falls into a local optimal solution, the learning for the synaptic connection can be stopped to escape from the local optimal solution.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An apparatus for controlling the learning of a neural network, said apparatus monitoring weight values of synaptic connections between units of said neural network, said weight values being able to be set in a learning process, said apparatus comprising:

weight record store means for storing past records of weight values which have been set in a predetermined number of preceding learning processes, each of said past records being defined for synaptic connection;

control means for receiving said past records from said weight record store means, for judging whether or not said received past records satisfy a predetermined condition, and for, when one of said received past records satisfies said predetermined condition, generating a signal to identify a synaptic connection which corresponds to said one of said received past records; and weight setting means for resetting the weight value of said identified synaptic connection to a predetermined value based on said signal in one or more succeeding learning processes.

2. An apparatus according to claim 1, wherein the number of succeeding learning processes is predetermined.

3. An apparatus according to claim 2, wherein said apparatus further comprises count means for counting the number of learning processes, said weight setting means performing said re-set based on the number of said learning processes of said count means in said predetermined number of succeeding learning processes.

4. An apparatus according to claim 2, wherein said predetermined condition is the condition in which the weight value of a synaptic connection has not been updated during a further predetermined number of preceding learning processes.

5. An apparatus according to claim 2, wherein said predetermined condition is the condition in which the weight value of a synaptic connection oscillates with respect to a certain value.

6. An apparatus according to claim 5, wherein said certain value is the average of weight values included in said one past record.

7. An apparatus according to claim 3, wherein said count means is provided for each of said synaptic connections.

8. An apparatus according to claim 1, wherein said control means comprises average means for calculating the average of weight values included in each of said past records.

9. An apparatus according to claim 8, wherein said predetermined condition is the condition in which the absolute value of the difference between the average of weight values included in the past record of one synaptic connection and the current weight value of said one synaptic connection is smaller than a prefixed value.

10. A neural network in which weight values of synaptic connections between units of said neural network are monitored, said weight values being able to be set in a learning process.

said neural network comprising:

weight record store means for storing past records of weight values which have been set in a predetermined number of preceding learning processes, each of said past records being defined for synaptic connection;

control means for receiving said past records from said weight record store means, for judging whether or not said received past records satisfy a predetermined condition, and for, when one of said received past records satisfies said predetermined condition, generating a signal to identify a synaptic connection which corresponds to said one of past said received past records; and weight setting means for resetting the weight value of said identified synaptic connection to a predetermined value based on said signal generated by said control means in one or more succeeding learning processes.

11. A neural network according to claim 10, wherein the number of succeeding learning processes is predetermined.

12. A neural network according to claim 11, wherein said neural network further comprises count means for counting the number of learning processes, said weight setting means performing said re-set based on the contents of said count means in said predetermined number of succeeding learning processes.

13. A neural network according to claim 11, wherein said predetermined condition is the condition in which the weight value of a synaptic connection has not been updated during a further predetermined number of preceding learning processes.

14. A neural network according to claim 11, wherein said predetermined condition is the condition in which the weight value of a synaptic connection oscillates with respect to a certain value.

15. A neural network according to claim 14, wherein said certain value is the average of weight values included in said one past record.

16. A neural network according to claim 12, wherein said count means is provided for each of said synaptic connections.

17. A neural network according to claim 10, wherein said control means comprises average means for calculating the average of weight values included in each of said past records.

18. A neural network according to claim 17, wherein said predetermined condition is the condition in which the absolute value of the difference between the average of weight values included in the past record of one synaptic connection and the current weight value of said one synaptic connection is smaller than a prefixed value.

* * * * *